(12) United States Patent
Tomita et al.

(10) Patent No.: US 8,595,650 B2
(45) Date of Patent: Nov. 26, 2013

(54) IMAGE PROCESSING APPARATUS, DISPLAY CONTROL METHOD THEREFOR, AND RECORDING MEDIUM

(75) Inventors: Atsushi Tomita, Toyohashi (JP); Kenichi Sawada, Toyohashi (JP); Takeshi Hibino, Toyokawa (JP); Takuya Okada, Toyokawa (JP)

(73) Assignee: Konica Minolta Business Technologies, Inc., Chiyod-Ku, Tokyo (JP)

( * ) Notice: Subject to any disclaimer, the term of this patent is extended or adjusted under 35 U.S.C. 154(b) by 250 days.

(21) Appl. No.: 12/978,815

(22) Filed: Dec. 27, 2010

(65) Prior Publication Data
US 2011/0161867 A1 Jun. 30, 2011

(30) Foreign Application Priority Data
Dec. 29, 2009 (JP) .................. 2009-299229

(51) Int. Cl.
*G06F 3/048* (2013.01)

(52) U.S. Cl.
USPC ........... 715/835; 715/764; 715/765; 715/785; 358/1.13; 358/1.15

(58) Field of Classification Search
USPC .................. 713/764, 765, 785, 835
See application file for complete search history.

(56) References Cited

U.S. PATENT DOCUMENTS 7,600,192 B1 10/2009 Hashimoto et al.
2006/0274347 A1 12/2006 Mori

FOREIGN PATENT DOCUMENTS

| CN | 1960410 | 5/2007 |
|---|---|---|
| JP | 2006-243952 A | 9/2006 |
| JP | 2006-323504 A | 11/2006 |
| JP | 2008-084250 A | 4/2008 |
| JP | 2009-266192 A | 11/2009 |
| WO | WO 00/33571 A1 | 6/2000 |

OTHER PUBLICATIONS

Comp-trans—2008084250—partial computer translation of Description of the Invention of JP 2008-84250.*
Comp-trans—2006243952—partial computer translation of Description of the Invention of JP 2006-243952.*
Office Action (notification of Reasons for Refusal) dated Nov. 8, 2011, issued in the corresponding Japanese Patent Application No. 2009-299229, and an English Translation thereof.
Office Action issued on Mar. 21, 2013 by Chinese Patent Office in corresponding Chinese Patent Application No. 201010611892, and English translation thereof.

* cited by examiner

*Primary Examiner* — Tadeese Hailu
(74) *Attorney, Agent, or Firm* — Buchanan Ingersoll & Rooney PC (57) ABSTRACT

An image processing apparatus has a display. A plurality of icons that correspond to a plurality of function buttons to set the functions installed on an image processing apparatus are displayed in the icon display area on the display, organized in groups by function attribute. When a position in the icon display area is arbitrarily specified by a user, then function buttons that correspond to icons lying at the user specified position, are displayed in the function button display area on the display.

27 Claims, 8 Drawing Sheets

IMAGE PROCESSING APPARATUS, DISPLAY CONTROL METHOD THEREFOR, AND RECORDING MEDIUM

This application claims priority under 35 U.S.C. §119 to Japanese Patent Application No. 2009-299229 filed on Dec. 29, 2009, the entire disclosure of which is incorporated herein by reference in its entirety.

BACKGROUND OF THE INVENTION

1. Field of the Invention

The present invention relates to: an image processing apparatus with a lot of functions, capable of displaying function buttons to call out setting screens to set the respective functions, on a display such as an operation panel; a display control method for the image processing apparatus to display the function buttons; and a computer readable recording medium having a display control program recorded therein to make a computer of the image processing apparatus execute processing.

2. Description of the Related Art

The following description sets forth the inventor's knowledge of related art and problems therein and should not be construed as an admission of knowledge in the prior art.

For example, as represented by a multifunctional image forming apparatus (Multi Function Peripheral) with multiple functions such as copying, printing, facsimile and scanning, an image processing apparatus of recent years has a lot of executable functions.

In order to use one of such functions, users need to call out a setting screen to set the function by pressing a function button displayed on an operation panel or etc. However, if more functions are installed, more function buttons will be displayed on the operation panel.

As conventionally practiced to improve this, function buttons are displayed in more than one step, that is function buttons are organized by function category, and when a user selects one of the function categories, then a plurality of function buttons organized in the selected function category are displayed, and when the user further selects one of the function buttons, then a setting screen to set the function is called out so that the user can perform setting on the setting screen.

And as disclosed in Unexamined Patent Publication No. 2006-243952, there has been an image processing apparatus configured such that function group icons to set a printer driver's functions are displayed in a first display area provided in the printer driver's setting screen, and when a user selects one of the function group icons, print condition items under the selected function group icon are further displayed in a second display area so that the user can set a print condition as they prefer, using the print condition items.

Furthermore, as disclosed in Unexamined Patent Publication No. 2006-323504, there has been an image processing apparatus configured such that a plurality of icons are displayed in list style in a list area and detail of the respective icons is further displayed by scrolling the list so that users can see a lot of icons or symbols and know the functions under the icons or symbols in a short time, regardless of whether they have previously used the functions or not.

However, with the configuration to display function buttons in more than one step, users need to call out some screens and/or scroll up and down on the screens to find a function button to set a target function, which is very troublesome.

And Unexamined Patent Publications No. 2006-243952 and No. 2006-323504 referenced above couldn't bring a perfect technology to resolve this problem.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that allows users to easily find a function button to set a target function even if a lot of functions are installed thereon.

It is another object of the present invention to provide a display control method for an image processing apparatus, which allows users to easily find a function button to set a target function even if a lot of functions are installed thereon.

It is yet another object of the present invention to provide a computer readable recording medium having a display control program recorded therein to make a computer of an image processing apparatus execute processing.

According to a first aspect of the present invention, an image processing apparatus includes:

a display that is capable of displaying at one view in the icon display area, a plurality of icons that correspond to a plurality of function buttons to call out setting screens to set the functions installed on the image processing apparatus, organized in groups by function attribute, and also displaying in the function button display area, a plurality of function buttons that correspond to a plurality of icons lying at a user specified position among those displayed in the icon display area;

a position identification portion that identifies the user specified position in the icon display area; and a display controller that displays the icons in the icon display area on the display, and also displays the function buttons that correspond to the icons lying at the position identified by the position identification portion, in the function button display area on the display.

According to a second aspect of the present invention, a display control method for an image processing apparatus includes:

identifying a user specified position in the icon display area on a display that is capable of displaying at one view in the icon display area, a plurality of icons that correspond to a plurality of function buttons to call out setting screens to set the functions installed on the image processing apparatus, organized in groups by function attribute and also displaying in the function button display area, a plurality of function buttons that correspond to a plurality of icons lying at the user specified position among those displayed in the icon display area; and displaying the icons in the icon display area on the display, and also displaying the function buttons that correspond to the icons lying at the identified position, in the function display area on the display.

According to a third aspect of the present invention, a non-transitory computer readable recording medium has a display control program for an image processing apparatus, recorded therein to make a computer of the image processing apparatus execute:

identifying a user specified position in the icon display area on a display that is capable of displaying at one view in the icon display area, a plurality of icons that correspond to a plurality of function buttons to call out setting screens to set the functions installed on an image processing apparatus, organized in groups by function attribute and also displaying in the function button display area, a plurality of function buttons that correspond to a plurality of icons lying at the user specified position among those displayed in the icon display area; and displaying the icons in the icon display area on the display, and also displaying the function buttons that correspond to the icons lying at the identified position, in the function display area on the display.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
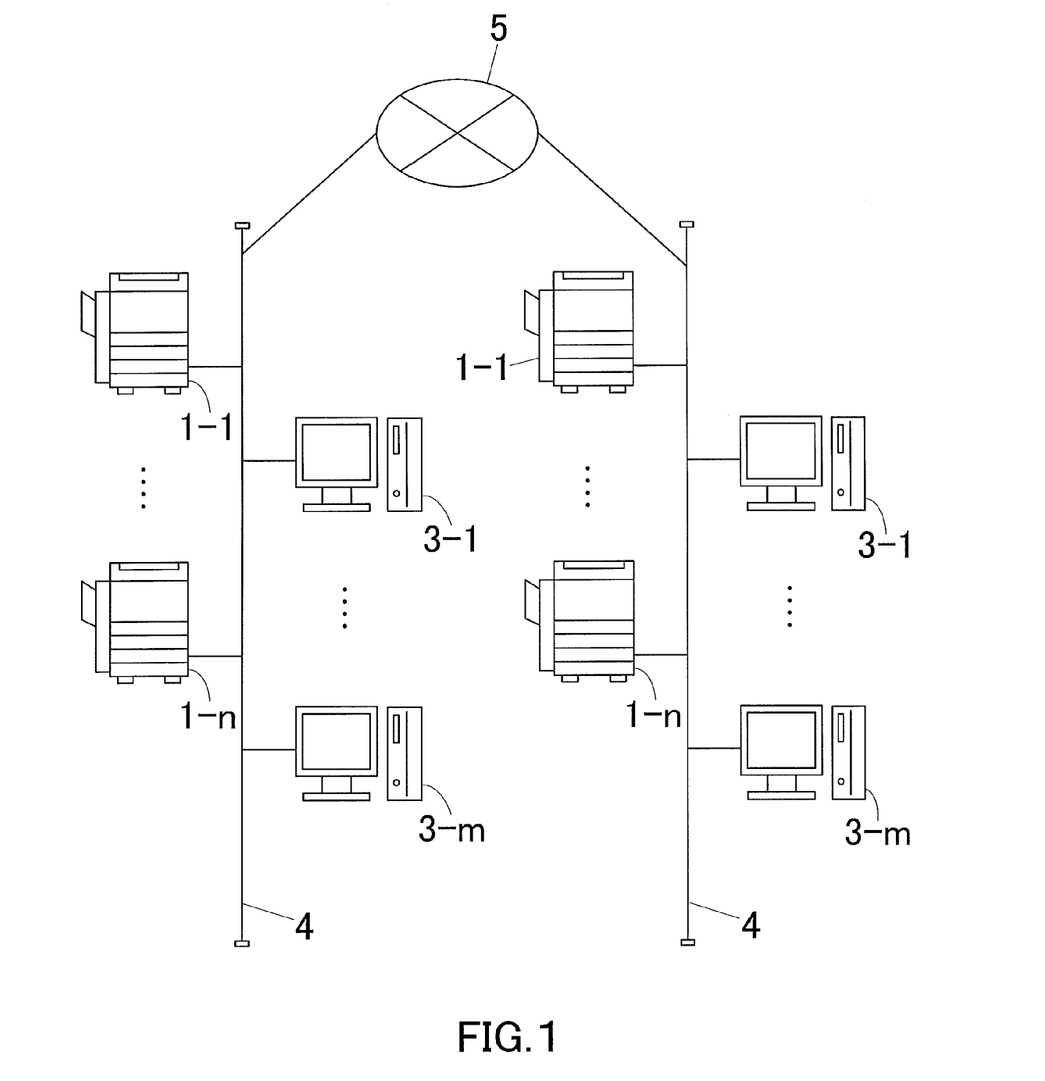
FIG. 1 is a frame format showing a configuration of an image forming system including an image forming apparatus according to one embodiment of the present invention.

FIG. 1 is a view to explain a configuration of a system including an image forming apparatus that is employed as an image processing apparatus according to one embodiment of the present invention.

This system includes an image forming apparatus 1-$x$ (x: 1~n) and an information processing apparatus 3-$y$ (y: 1~m).

The image forming apparatus 1-$x$ and the information processing apparatus 3-$y$ are connected to each other via a network 4.

This network 4 may be a dedicated line such as a LAN (Local Area Network), a public circuit or a wireless communication line.

And the network 4 is connected to another network via an external network 5.

The image forming apparatus 1-$x$ forms on paper an image read out from a document and an image copied from another image that is generated based on print data received from the information processing apparatus 3-$y$. The print data corresponds to: a draw command in a page description language so that the image forming apparatus 1-$x$ can process the command, which is obtained by a printer driver, converting another draw command issued by an operating system or an application program of the information processing apparatus 3-$y$; or document data in a file format such as PDF, TIFF, JPEG or XPS.

Meanwhile the image read out from a document may be transmitted to the information processing apparatus 3-$y$ and also other image forming apparatuses, via the network 4. Or alternatively, it may be transmitted to other image forming apparatuses and information processing apparatuses connected to another network, via the external network 5.

The information processing apparatus 3-$y$ is a commonly used computer-controller machine, which includes a CPU, a RAM, a fixed recording medium (a hard disk drive for example), a monitor, a keyboard, a mouse and etc. connected to each other. The information processing apparatus 3-$y$ generates print data according to a user instruction and transmits the generated print data to the image forming apparatus 1-$x$.

Figure 2:
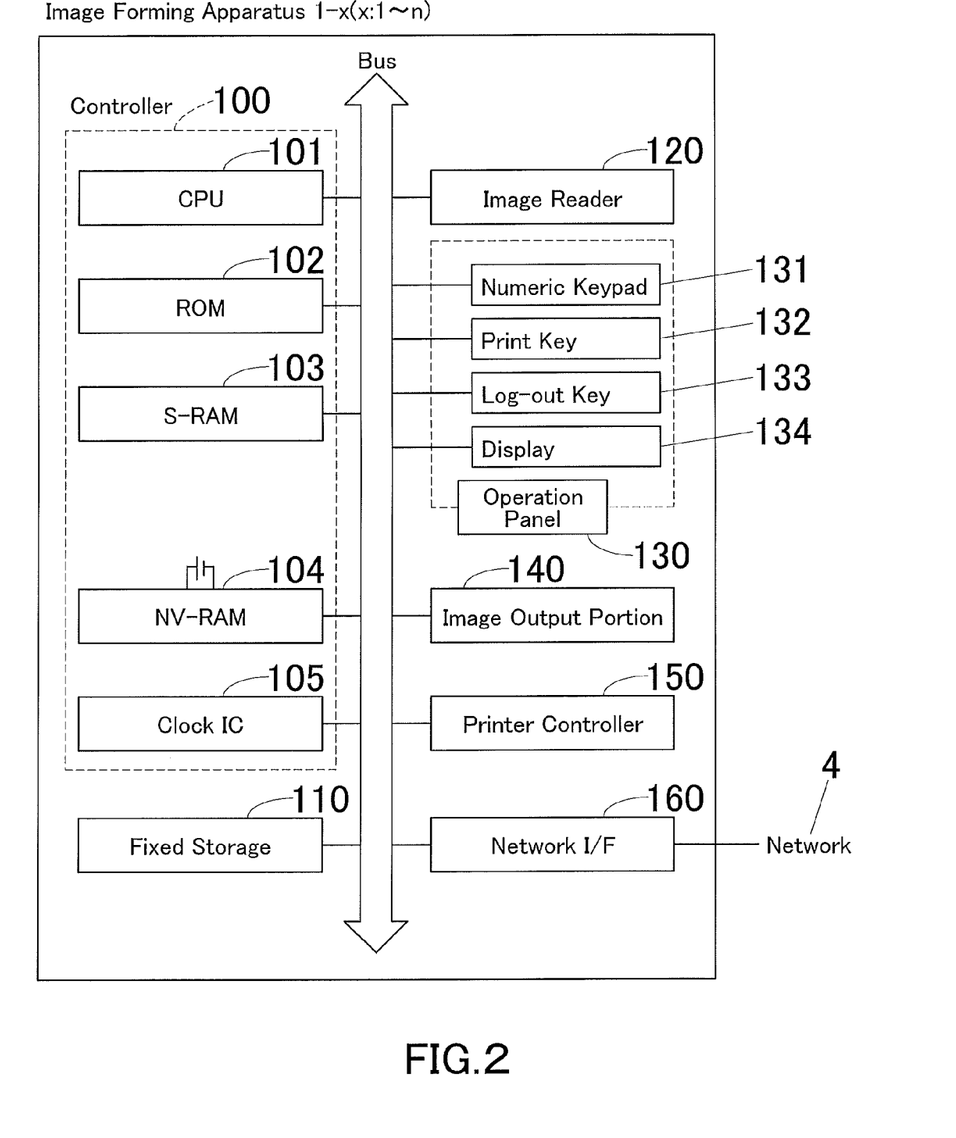
FIG. 2 is a view showing an internal configuration of the image forming apparatus of FIG. 1.

FIG. 2 is a view showing an internal configuration of the image forming apparatus 1-$x$. A controller 100 of the image forming apparatus 1-$x$ includes a CPU 101, a ROM 102 storing a control program, a S-RAM (Static Random Access Memory) 103 used for processing, a NV-RAM (nonvolatile memory) 104 storing various settings about image forming backed up in its internal battery, and a clock IC 105 and all these are connected to each other via a bus.

This controller 100 is connected to: an operation panel 130 including various keys such as a numeric keypad 131 for various entries, a print key 132 and a log-out key 133, and a display 134; an image reader 120 that reads an image on a document; a network interface 160 that serves to exchange various information with external devices connected via the network 4, for example the information processing apparatus 3-$y$; a printer controller 150 that performs image transcription based on print data received via the network interface 160; and an image output portion 140 that forms the image transcript on paper, respectively, via a bus.

The controller 100 is further connected to a fixed storage 110 via the bus. The fixed storage 110 is a hard disk drive, for example. The fixed storage 110 stores various data.

Hereinafter, processing routines executed by the image forming apparatus 1-$x$ will be described.

Figure 3:
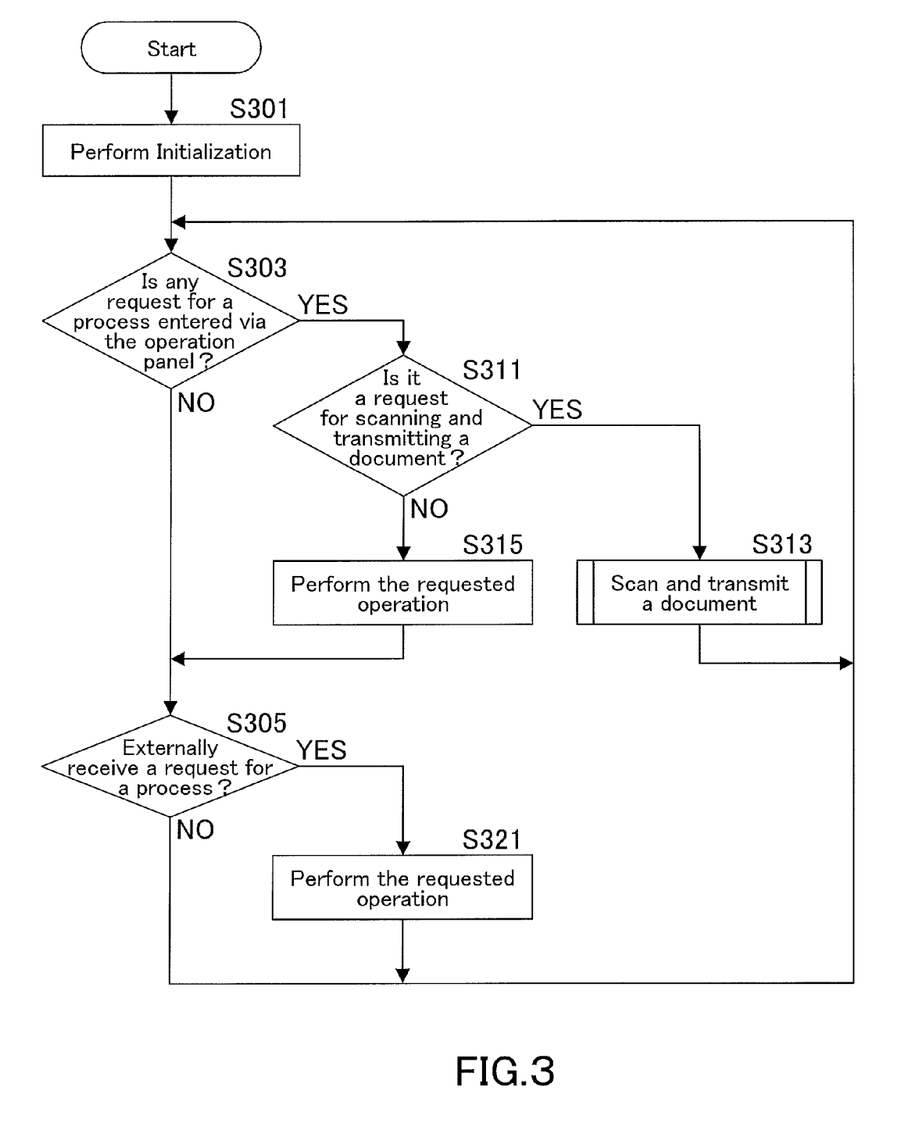
FIG. 3 is a flowchart representing an main process routine executed by the image forming apparatus.

At first, a main process routine of the image forming apparatus 1-$x$ will be described according to the flowchart shown in FIG. 3.

At occurrence of an event, for example when the power is on, the CPU 101 activates the processing routine. Then the memory is cleared and the setting is initialized, for example returned to the standard mode (Step S301).

When the initialization process is completed, then it is judged whether or not a user entered any request for a process (a request for making a copy, setting or etc.) via the keys and switches on the operation panel 130 and the display 134 of the image forming apparatus 1-x (Step S303). If he/she did not enter any request for a process (NO in Step S303), the routine proceeds to Step S305.

If he/she entered a request for a process (YES in Step S303), then in Step S311, it is judged whether or not it is a request for scanning and transmitting a document. If it is a request for scanning and transmitting a document (YES in Step S311), the scanning and transmitting process is performed in Step S313.

If it is not a request for scanning and transmitting a document (NO in Step S311), the requested operation is performed in Step S315. Other than scanning and transmitting a document, the operation requested via the keys and switches of the operation panel 130 and the display 134 of the image forming apparatus 1-x may be to copy a document, scan a document, change various settings stored on the NV-RAM 104, or etc. When the requested operation is completed, then the routine proceeds to Step S305.

In Step S305, it is judged whether or not any request for a process (a request for printing a document, setting or etc.) is received via the network 4, from an external device such as the information processing apparatus 3-y. If no such request is received therefrom (NO in Step S305), the routine goes back to Step S303.

If a request for a process is received from an external device (YES in Step S305), the requested operation is performed in Step S321. The operation requested via the external device may be to execute a print job received from the information processing apparatus 3-y, change various settings stored in the NV-RAM 104, or etc. When the requested operation is completed, then the routine goes back to Step S303 to repeat therefrom.

Hereinafter, operation screens displayed on the display 134 of the operation panel 130 will be described.

Figure 4:
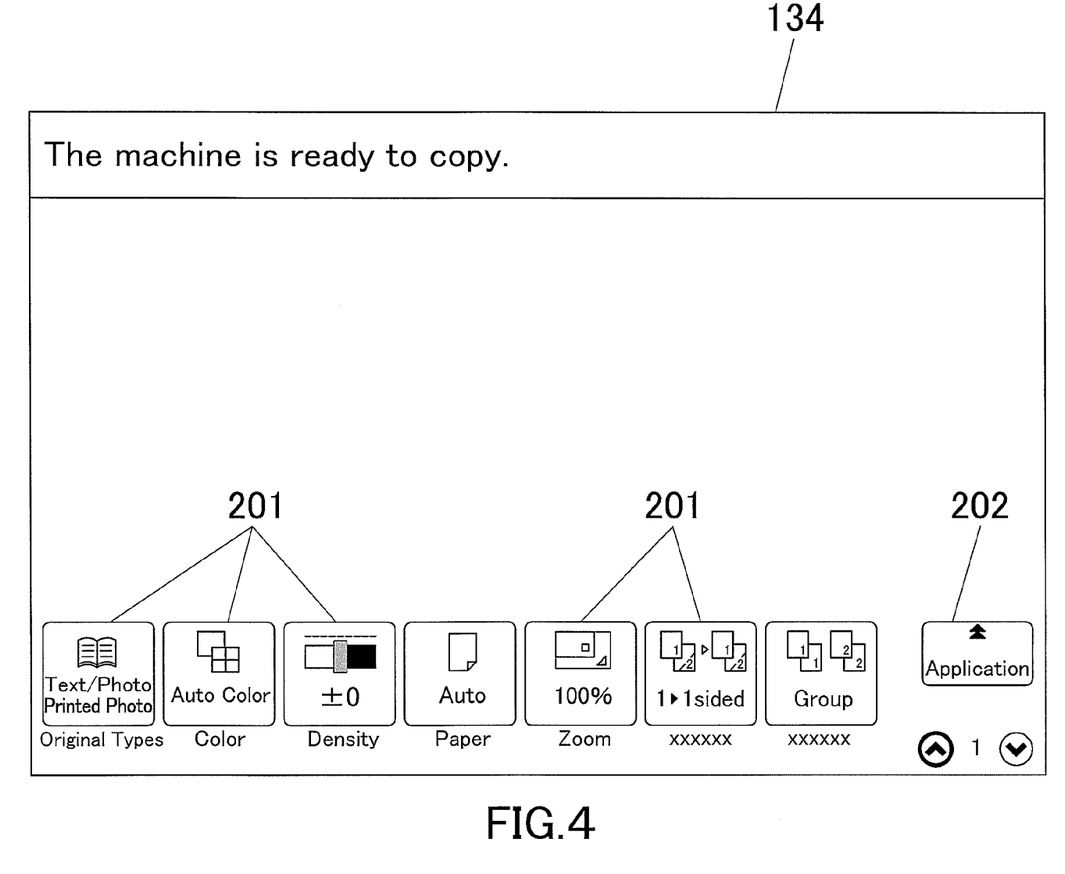
FIG. 4 is a view showing an example of a screen displayed on a display of an operation panel in the basic mode.

FIG. 4 shows a basic mode screen displayed on the display 134.

This is a copy setting screen displayed in the basic mode and setting buttons 201 are provided for setting the copy condition in this screen. Also at right of this screen, an "Application" button 202 is displayed.

Figure 5:
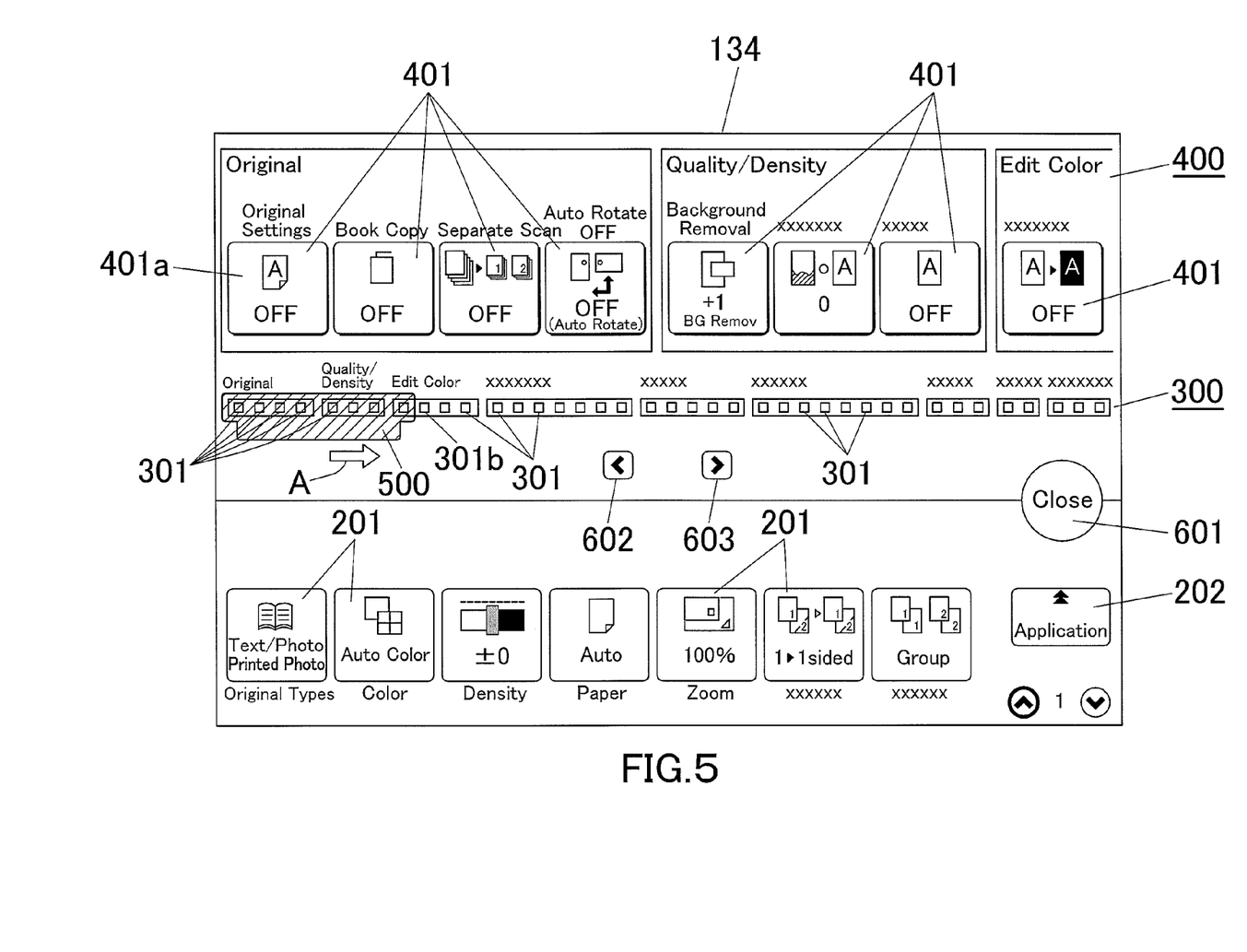
FIG. 5 is a view showing an example of a screen displayed on a display of an operation panel in the application mode.

When a user presses the "Application" button 202, then the image forming apparatus 1-x turns to the application mode and the basic mode screen illustrated in FIG. 4 is switched to the initial application mode screen illustrated in FIG. 5. This application mode is prepared for users who hope to use a function of an external device instead of the copy function of the image forming apparatus 1-x.

As for the initial application mode screen displayed on the display 134, illustrated in FIG. 5, an icon display area 300 is positioned approximately in the center of the vertical direction, and a function button display area 400 is positioned in the upper area and the vicinity of the icon display area 300.

The icon display area 300 is the place where most of all icons that correspond to function buttons to call out setting screens of the functions installed on the image forming apparatus 1-x, are displayed at one view organized in groups by function attribute, and therein a plurality of icons 301 represented by squares are displayed in one line in the horizontal direction, organized in groups. In other words, this icon display area 300 is the place where the map of the functions installed on the image forming apparatus 1-x is displayed.

In this embodiment, the groups of icons 301 are named "Original", "Quality/Density" and "Edit Color" for example, as illustrated in FIG. 5. Here, users can know that the "Original" group has four function buttons, since four icons 301 are organized in this group.

Also, users can know that the "Quality/Density" group has three function buttons and the "Edit Color" group has four function buttons, since three icons 301 and four icons 301 are organized in these groups, respectively.

In the icon display area 300, a cursor 500 (the shadow area) indicates some icons 301. Users can arbitrarily touch and slide this cursor 500 along the icon display area 300 by dragging it in the array direction of the icons 301. In this embodiment, the cursor 500 indicates as many as eight icons 301 even while it is in motion.

The function buttons 401 corresponding to as many as eight icons 301 that the cursor 500 indicates appear in the function button display area 400 near the icon display area 300, organized in groups just like the icons 301.

In the example of FIG. 5, the cursor 500 indicates four icons 301 from the "Original" group, three icons 301 from the "Quality/Density" group and four icons 301 from the "Edit Color" group. Accordingly four function buttons 401, three function buttons 401 and one function button 401 appear in the function button display area 400, organized in the "Original" group, the "Quality/Density" group and the "Edit Color" group with their group names, respectively. In this embodiment, the four function buttons 401 in the "Original" group are named "Original Settings", "Book Copy", "Separate Scan" and "Auto Rotate", respectively. And the three function buttons 401 in the "Quality/Density" group are named "Background Removal", "Text Enhancement" and "Glossy", respectively. The one function button 401 in the "Edit Color" group is named "Neg./Pos. Reverse".

On this screen, when a user touches and slides the cursor 500 only by a distance of one icon for example, to the right as indicated by Arrow A in FIG. 5, then the cursor 500 indicates three icons 301 from the "Original" group, three icons 301 from the "Quality/Density" group and two icons 301 from the "Edit Color" group. With the motion of the cursor 500, in the function button display area 400 on the display 134, the function button 401a named "Original Settings" at the extreme left of FIG. 5 is gone while the other seven function buttons 401 remain as is, and in return for the missing function button 401a, another function button 401 that corresponds to the next icon 301b in the "Edit Color" group comes up at the extreme right of FIG. 5.

Figure 6:
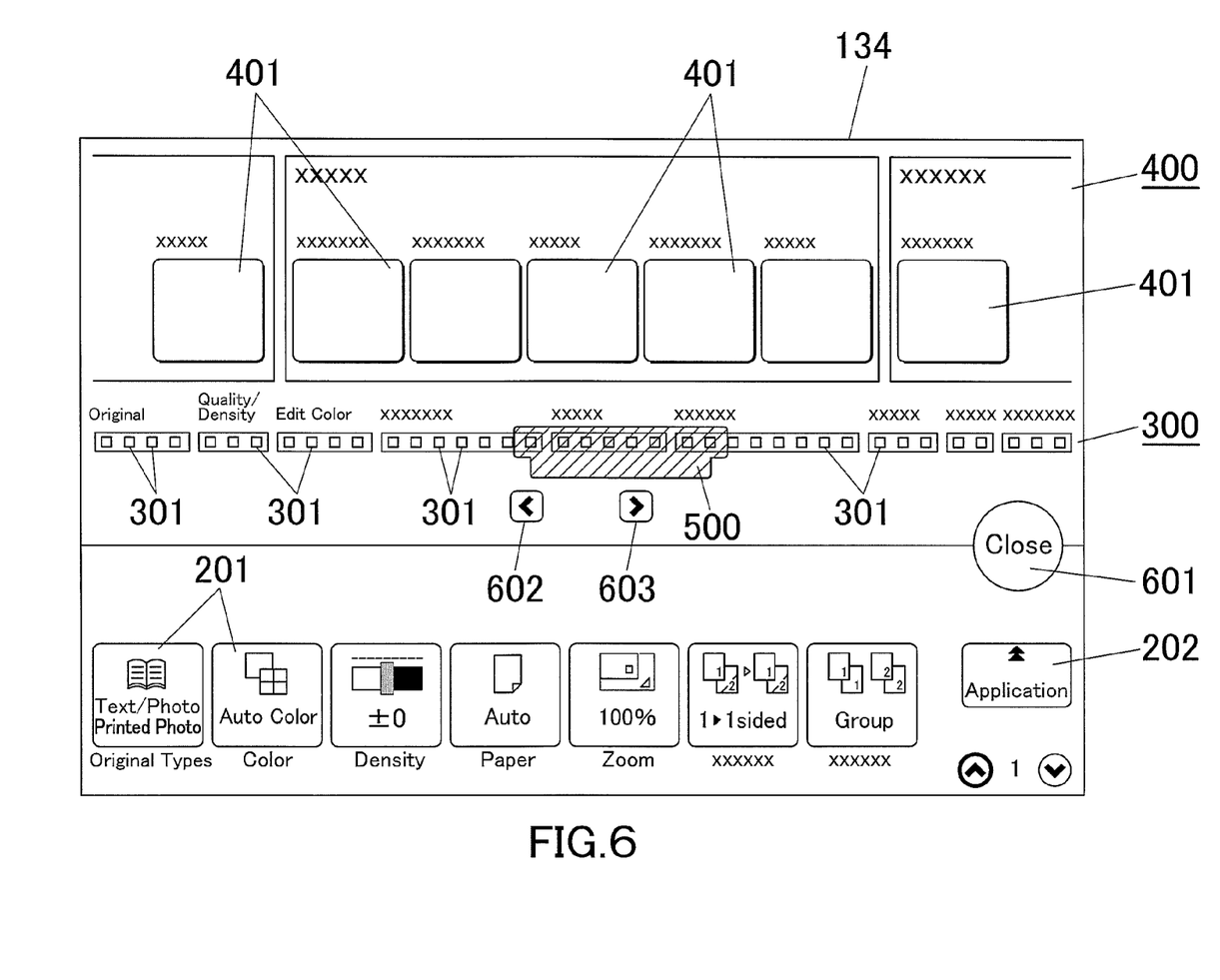
FIG. 6 is a view showing a screen displayed when a cursor has been slid on the screen of FIG. 5.

When the user further slides the cursor 500 as illustrated in FIG. 6, then other eight function buttons 401 that correspond to other eight icons 301 that the cursor 500 indicates show up in the function button display area 400. While the cursor 500 is in motion, eight function buttons 401 that appear in the function button display area 400 may change from one set to another according to the motion. Meanwhile, when the user touches an arbitrary position in the icon display area 300, the cursor 500 may immediately jump to the touched position.

As described above, contrary to the conventional practice, function buttons 401 are not displayed in more than one step, in this embodiment of the present invention. That is, when a user arbitrarily touches and slides the cursor 500 that moves along the icon display area 300, then eight function buttons 401 corresponding to eight icons that the cursor 500 indicates show up in the function button display area 400 so that the user can specify a target function. With this configuration, users can obtain a very good operability that appeals to the human sense, without the need of calling out some screens and/or scrolling up and down on the screens to find a function button to set a target function.

Furthermore, users can instantly recognize that function buttons 401 that currently appear in the function button display area 400 are just some of the existing function buttons 401, since the icon display area 300 is provided, and also they can instantly recognize that icons 301 that are reflected to the function button display area 400 are just some of the existing icons 301, since the length of the cursor 500 depends on the number of the function buttons 401 that appear in the function button display area 400. In this way, the usefulness is much more improved.

In the embodiment of FIG. 5 and FIG. 6, users select one preferable set of function buttons 401 to display in the function button display area 400 by sliding the cursor 500. Alternatively, another configuration may be employed wherein users specify an icon 301 by touching a position in the icon display area 300, and recognizing the touched position as a user specified icon, a controller 100 calls out a predetermined number of function buttons that correspond to the user specified icon and the icons lying nearby, in the function button display area 400. Also in this alternative configuration, while users are dragging from the touched position to another position, function buttons 401 that appear in the function button display area 400 may change from one set to another according to the motion.

As illustrated in FIG. 5 and FIG. 6, a "Close" button 601, a back arrow button 602, a forward arrow button 603 and etc. are displayed on the screen, in addition to the icons 301 and the function buttons 401. The "Close" button 601 is pressed to finish the application mode and return to a basic mode screen. The back arrow button 602 is pressed to call out a set of function buttons 401 before the current one. The forward arrow button 603 is pressed to call out a set of function buttons 401 after the current one.

Figure 7:
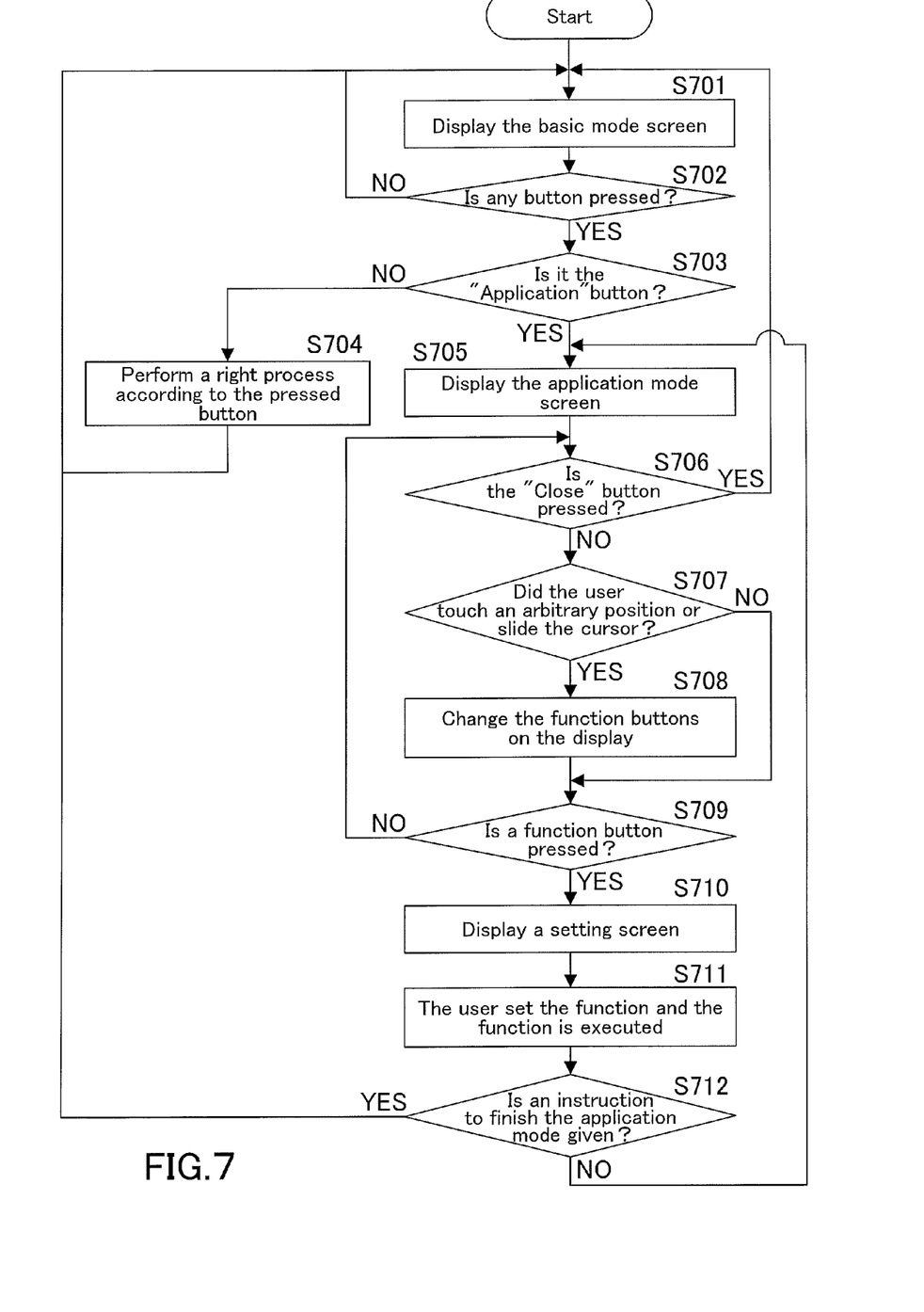
FIG. 7 is a flowchart representing a display control processing routine executed by the image forming apparatus.

FIG. 7 is a flowchart representing a processing routine to control the display 134. This routine is executed by a CPU 101 of the controller 100 of the image forming apparatus 1-$x$ according to a program stored in a recording medium such as a ROM 12, In Step S701, the basic mode screen illustrated in FIG. 4 is displayed. And it is judged in Step S702, whether or not any button is pressed on the screen. If no button is pressed (NO in Step S702), the routine goes back to Step S701 to keep the screen displayed as is.

If a button is pressed (YES in Step S702), then it is judged in Step S703, whether or not it is the "Application" button 202. If it is not the "Application" button 202 (NO in Step S703), a right process is performed according to the pressed button in Step S704, then the routine goes back to Step S701.

If it is the "Application" button 202 (YES in Step S703), then in Step S705, the basic mode is switched to the application mode and the initial application mode screen illustrated in FIG. 5 is displayed on the display 134. And in Step S706, it is judged whether or not the "Close" button 601 is pressed. If the "Close" button 601 is pressed (YES in Step S706), the application mode is finished and the routine goes back to Step S701 to keep the basic mode screen displayed as is.

If the "Close" button 601 is not pressed (NO in Step S706), then in Step S707, it is judged whether or not the user touched an arbitrary position in the icon display area 300, alternatively if the cursor 500 is provided, it is judged whether or not the user slid the cursor 500.

If the user didn't touch such a position or slide the cursor 500 (NO in Step S707), then the routine proceeds to Step S709. If the user touched such a position or slid the cursor 500 (YES in Step S707), then in Step S708, the touched position and the position where the cursor 500 was left are recognized, and a set of function buttons 401 that currently appears in the function button display area 400 are gone while another set of function buttons 401 that correspond to the icons 301 lying at the recognized position, show up in the function button display area 400. After that, the routine proceeds to Step S709.

In Step S709, it is judged whether or not one of the function buttons 401 that appear in the function button display area 400 is pressed by the user. If a function button 401 is not pressed (NO in Step S709), then the routine goes back to Step S706. If a function button is pressed (YES in Step S709), then in Step S710, a setting screen to set a function of the pressed function button is displayed on the display 134. And the user sets the function and the function is executed according to the setting in Step S711, then the routine proceeds to Step S712.

In Step S712, an instruction to finish the application mode is given by the user. If such an instruction is not given (NO in Step S712), then the routine goes back to Step S705 to display the application mode screen illustrated in FIG. 5. Meanwhile, if an instruction to finish the application mode is given (YES in Step S712), then the routine goes back to Step S701 to display the basic mode screen.

Figure 8:
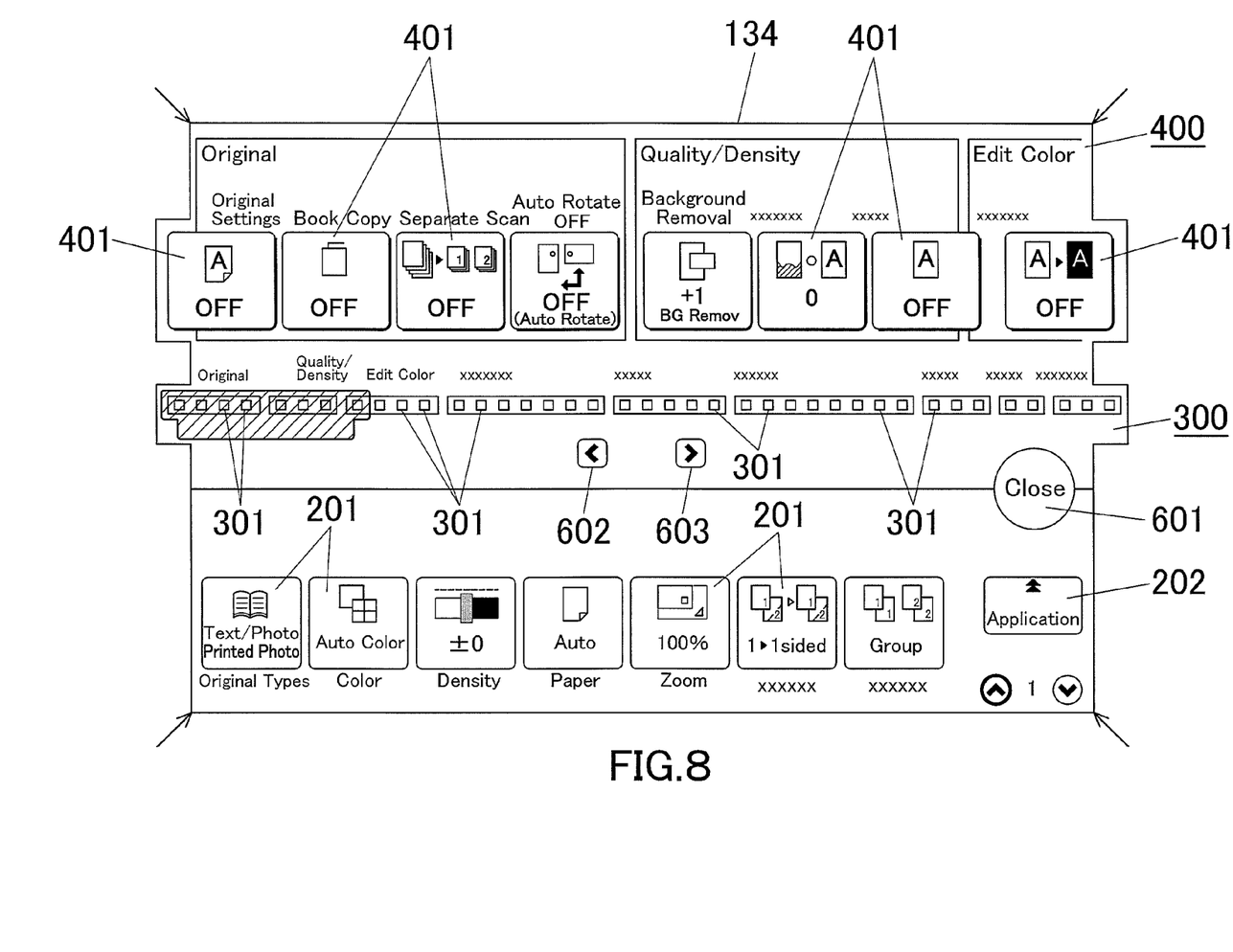
FIG. 8 is a view showing another example of a screen displayed on a display of an operation panel in the application mode.

FIG. 8 shows another embodiment of the present invention.

Sometimes all icons 301 cannot be laid out in one line because there are so many function buttons 401 that correspond to the icons 301. In such a case, users cannot easily recognize that some of the icons 301 are hidden behind the screen displayed on the display 134.

If all icons 301 cannot be laid out in one line in the icon display area 300, the icon display area 300 is displayed with its right and left ends being extended in the horizontal direction outward from the screen pane on the display 134, as illustrated in FIG. 8. In this embodiment, as well as the icon display area 300, the function button display area 400 is also displayed with its right and left ends being extended in the horizontal direction outward from the screen pane on the display 134, and function buttons 401 are laid out from the extreme right to the extreme left of the extended function button display area 401. More specifically, to obtain the screen of FIG. 8, the screen of the former embodiment is displayed in a smaller size except the icon display area 300 and the function button display area 400, as indicated by arrows at four corners of the screen of FIG. 8.

As described above, the icon display area 300 is displayed with its right and left ends (at least one of them) being extended in the horizontal direction outward from the screen pane on the display 134, so that users can easily recognize that some icons 301 are hidden behind the screen.

Furthermore, users can show the hidden icons 301 on the screen by scrolling the icon display area 300 to the right or left with the cursor 500. Or alternatively, users can show the hidden icons 301 on the screen by touching and dragging an icon 301 in the icon display area 300 to the right or left.

That is all about one embodiment of the present invention. However, the present invention is not limited to the embodiments described above.

For example, as many as eight function buttons 401 appear at the same time in the function button display area 400 in those embodiments. However, the number of function buttons 401 that appear at the same time may be changed.

For example, if an image processing apparatus which use of the functions is limited by the administrator or a monochrome image forming apparatus having a comparatively few functions is used, it is natural that the number of groups where function buttons 401 are organized becomes small and the number of function buttons 401 also becomes small. In such a case, the cursor 500 may be extended in length (the number of icons 301 indicated by the cursor 500 is reduced) so that users can have a better operability when sliding the cursor 500 and can more easily recognize the function buttons 401.

Ordinary users or administrative users may change the cursor 500 in length. Or alternatively, the image processing apparatus 1-$x$ may count the number of groups or function buttons 401 and automatically change the cursor 500 in length based on the counted number, more specifically the controller 100 may have an algorithmic program to change the cursor 500 in length in reverse proportion to the number of groups or function buttons 401.

In addition to changing the cursor 500 in length, the sliding speed of the cursor 500 may be adjusted appropriately for individual users so that they can have a good operability with a customized setting for himself/herself.

If there found extra spaces both above and below the cursor 500 in the plain view, the cursor 500 may be extended in width (in the vertical direction) so that users can have a better operability when touching the cursor 500.

Although it is not illustrated in any Figures, a position touched by a user may be displayed in a larger size and/or at a higher light level, or alternatively it may be displayed in a larger size and all the area other than the touched position may be displayed at a lower light level at the same time, so that the user can more easily recognize the current state of operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
    a display portion that is capable of: displaying in one view in an icon display area, a plurality of icons that correspond one-to-one with a plurality of function buttons which call out setting screens to set functions installed on the image processing apparatus; and also displaying in a function button display area, at least some of the function buttons that correspond one-to-one with at least some of the icons residing at a user specified position;
    a position identification portion that identifies the user specified position in the icon display area; and
    a display controller that makes the display portion display:
    the icons in the icon display area, the icons being organized in groups by function attribute; and
    the at least some of the function buttons that correspond one-to-one with the at least some of the icons residing at the position identified by the position identification portion, in the function button display area, the function buttons being organized in groups by function attribute similar to the organization of the icons in the icon display area.

2. The image processing apparatus as recited in claim 1, wherein:
    the position identification portion identifies a position in the icon display area, touched by a user, as the user specified position.

3. The image processing apparatus as recited in claim 1, wherein:
    the display controller makes the display portion display the icons in on line in the icon display area, and also displays a cursor to be freely slid by the user along the icon display area, in the icon display area; and
    the position identification portion identifies a position indicated by the cursor as the user specified position.

4. The image processing apparatus as recited in claim 3, wherein:
    the cursor can be changed in length and/or in sliding speed based on the number of the icons.

5. The image processing apparatus as recited in claim 1, wherein:
    the display controller makes the display portion display the user specified position in a larger size.

6. The image processing apparatus as recited in claim 1, wherein:
    the display controller makes the display portion display the icons in one line in the icon display area which is included in a screen pane, meanwhile if all the icons cannot be laid out in one line, the display controller makes the display portion display the icons in the icon display area one or both of whose ends appear extending in the icon array direction outward from the screen pane, by reducing the size of the screen pane.

7. The image processing apparatus as recited in claim 1, wherein a number of icons organized in an icon group corresponding to a first function attribute equals a number of function buttons organized in a function button group corresponding to the first function attribute.

8. A display control method for an image processing apparatus, comprising:
    identifying a user specified position in an icon display area on a display portion that is capable of: displaying in one view in the icon display area, a plurality of icons that correspond one-to-one with a plurality of function buttons which call out setting screens to set functions installed on the image processing apparatus; and also displaying in a function button display area, at least some of the function buttons that correspond one-to-one with at least some of the icons residing at the user specified position; and making the display portion display:

the icons in the icon display area, the icons being organized in groups by function attribute; and the at least some of the function buttons that correspond one-to-one with the at least some of the icons residing at the identified position, in the function button display area, the function buttons being organized in groups by function attribute similar to the organization of the icons in the icon display area.

9. The display control method recited in claim 8, wherein:

a position in the icon display area, touched by a user, is identified as the user specified position.

10. The display control method recited in claim 8, wherein:

the icons are displayed in one line in the icon display area and a cursor to be freely slid by the user along the icon display area is also displayed in the icon display area; and a position indicated by the cursor is identified as the user specified position.

11. The display control method recited in claim 10, wherein:

the cursor can be changed in length and/or in sliding speed based on the number of the icons.

12. The display control method recited in claim 8, wherein:

the user specified position is displayed in a larger size.

13. The display control method recited in claim 8, wherein:

the icons are displayed in one line in the icon display area which is included in a screen pane, meanwhile if all the icons cannot be laid out in one line, the icons are displayed in the icon display area one or both of whose ends appear extending in the icon array direction outward from the screen pane, by reducing the size of the screen pane.

14. The display control method as recited in claim 8, wherein a number of icons organized in an icon group corresponding to a first function attribute equals a number of function buttons organized in a function button group corresponding to the first function attribute.

15. A nontransitory computer readable medium encoded with a display control program making a computer of an image processing apparatus execute:

identifying a user specified position in an icon display area on a display portion that is capable of: displaying in one view in the icon display area, a plurality of icons that correspond one-to-one with a plurality of function buttons which call out setting screens to set functions installed on the image processing apparatus; and also displaying in a function button display area, at least some of the function buttons that correspond one-to-one with at least some of the icons residing at the user specified position; and making the display portion display:

the icons in the icon display area, the icons being organized in groups by function attribute; and the at least some of the function buttons that correspond one-to-one with the at least some of the icons residing at the identified position, in the function button display area, the function buttons being organized in groups by function attribute similar to the organization of the icons in the icon display area.

16. The display control program making the computer execute processing as recited in claim 15, wherein:

a position in the icon display area, touched by a user, is identified as the user specified position.

17. The display control program making the computer execute processing as recited in claim 15, wherein:

the icons are displayed in one line in the icon display area and a cursor to be freely slid by the user along the icon display area is also displayed in the icon display area; and a position indicated by the cursor is identified as the user specified position.

18. The display control program making the computer execute processing as recited in claim 17, wherein:

the cursor can be changed in length and/or in sliding speed based on the number of the icons.

19. The display control program making the computer execute processing as recited in claim 15, wherein:

the user specified position is displayed in a larger size.

20. The display control program making the computer execute processing as recited in claim 15, wherein:

the icons are displayed in one line in the icon display area which is included in a screen pane, meanwhile if all the icons cannot be laid out in one line, the icons are displayed in the icon display area one or both of whose ends appear extending in the icon array direction outward from the screen pane, by reducing the size of the screen pane.

21. The display control program making the computer execute processing as recited in claim 15, wherein a number of icons organized in an icon group corresponding to a first function attribute equals a number of function buttons organized in a function button group corresponding to the first function attribute.

22. An image processing apparatus comprising:

a display portion that is capable of: displaying in one view in an icon display area, a plurality of icons that correspond one-to-one with a plurality of function buttons which call out setting screens to set functions installed on the image processing apparatus; and also displaying in a function button display area, at least some of the function buttons that correspond one-to-one with at least some of the icons residing at a user specified position;

a position identification portion that identifies the user specified position in the icon display area; and a display controller that makes the display portion display:

the icons in the icon display area, the icons being organized in groups by function attribute; and the at least some of the function buttons that correspond one-to-one with the at least some of the icons residing at the position identified by the position identification portion, in the function button display area, wherein the display controller makes the display portion display the icons in one line in the icon display area which is included in a screen pane, meanwhile if all the icons cannot be laid out in one line, the display controller makes the display portion display the icons in the icon display area one or both of whose ends appear extending in the icon array direction outward from the screen pane, by reducing the size of the screen pane.

23. The image processing apparatus as recited in claim 22, wherein the function buttons are organized in groups by function attribute, and wherein a number of icons organized in an icon group corresponding to a first function attribute equals a number of function buttons organized in a function button group corresponding to the first function attribute.

24. A display control method for an image processing apparatus, comprising:

identifying a user specified position in an icon display area on a display portion that is capable of: displaying in one view in the icon display area, a plurality of icons that correspond one-to-one with a plurality of function buttons which call out setting screens to set functions installed on the image processing apparatus; and also displaying in a function button display area, at least some of the function buttons that correspond one-to-one with at least some of the icons residing at the user specified position; and making the display portion display:

the icons in the icon display area, the icons being organized in groups by function attribute; and the at least some of the function buttons that correspond one-to-one with the at least some of the icons residing at the identified position, in the function button display area, wherein the display controller makes the display portion display the icons in one line in the icon display area which is included in a screen pane, meanwhile if all the icons cannot be laid out in one line, the display controller makes the display portion display the icons in the icon display area one or both of whose ends appear extending in the icon array direction outward from the screen pane, by reducing the size of the screen pane.

25. The display control method as recited in claim 24, wherein the function buttons are organized in groups by function attribute, and wherein a number of icons organized in an icon group corresponding to a first function attribute equals a number of function buttons organized in a function button group corresponding to the first function attribute.

26. A nontransitory computer readable medium encoded with a display control program making a computer of an image processing apparatus execute:

identifying a user specified position in an icon display area on a display portion that is capable of: displaying in one view in the icon display area, a plurality of icons that correspond one-to-one with a plurality of function buttons which call out setting screens to set functions installed on the image processing apparatus; and also displaying in a function button display area, at least some of the function buttons that correspond one-to-one with at least some of the icons residing at the user specified position; and making the display portion display:

the icons in the icon display area, the icons being organized in groups by function attribute; and the at least some of the function buttons that correspond one-to-one with the at least some of the icons residing at the identified position, in the function button display area, wherein the display controller makes the display portion display the icons in one line in the icon display area which is included in a screen pane, meanwhile if all the icons cannot be laid out in one line, the display controller makes the display portion display the icons in the icon display area one or both of whose ends appear extending in the icon array direction outward from the screen pane, by reducing the size of the screen pane.

27. The display control program making the computer execute processing as recited in claim 26, wherein the function buttons are organized in groups by function attribute, and wherein a number of icons organized in an icon group corresponding to a first function attribute equals a number of function buttons organized in a function button group corresponding to the first function attribute.

* * * * *